United States Patent [19]
Kwon

[11] Patent Number: 5,769,357
[45] Date of Patent: Jun. 23, 1998

[54] TAPE GUIDE ROLLER ASSEMBLY WITH IMPEDANCE CHARACTERISTICS

[75] Inventor: Seog-Ha Kwon, Seoul, Rep. of Korea

[73] Assignee: Daewoo Electronics Co., Ltd., Seoul, Rep. of Korea

[21] Appl. No.: 651,488

[22] Filed: May 22, 1996

[30] Foreign Application Priority Data

Jun. 30, 1995 [KR] Rep. of Korea ...................... 95-18642

[51] Int. Cl.[6] .................................................. B65H 57/14
[52] U.S. Cl. .................................... 242/615.2; 242/346.2; 226/190
[58] Field of Search ............................... 242/346.2, 324, 242/615.2, 419.8; 226/190

[56] References Cited

U.S. PATENT DOCUMENTS

| 3,276,651 | 10/1966 | Bryer | 242/615.2 |
| 3,735,940 | 5/1973 | Schwartz | 242/346.2 |
| 3,768,717 | 10/1973 | Salcedo | 242/615.2 |
| 3,985,043 | 10/1976 | Toratani | 226/190 X |
| 4,335,857 | 6/1982 | Pfost et al. | 242/346.2 |
| 4,729,500 | 3/1988 | Gwon | 242/346.2 X |
| 4,903,878 | 2/1990 | Usami et al. | 226/190 |
| 5,005,748 | 4/1991 | Kim | 242/615.2 |
| 5,407,117 | 4/1995 | Yokoo et al. | 226/190 |
| 5,501,386 | 3/1996 | Kobayashi | 226/190 |

FOREIGN PATENT DOCUMENTS

| 66725 | 3/1969 | German Dem. Rep. | 226/190 |
| 3122860 | 5/1991 | Japan | 242/346.2 |
| 375606 | 4/1964 | Switzerland | 226/190 |
| 2223006 | 3/1990 | United Kingdom | 226/190 |

OTHER PUBLICATIONS

A.H. Dahlin, Capstan Securing Device, IBM Technical Disclosure Bulletin vol. 4 No. 3, Aug. 1961.

Primary Examiner—William Stryjewski
Assistant Examiner—Gregory J. Strimbu
Attorney, Agent, or Firm—Pennie and Edmonds, LLP

[57] ABSTRACT

A guide roller assembly for use in a recorder fulfilling the functions of both a conventional guide roller assembly and a conventional impedance roller assembly comprises a stationary shaft tightly fitted into a bore hole prepared in a pole base, a lower flange tightly fitted around the stationary shaft, a guide roller, rotatably fitted around the stationary shaft, and including an upper drum-like section and a lower cylindrical section having a diameter smaller than that of the lower flange, an upper flange, provided on the cylindrical section of the guide roller, and a shallow notch which circumscribes the cylindrical section of the guide roller, directly below the upper flange.

4 Claims, 5 Drawing Sheets

TAPE GUIDE ROLLER ASSEMBLY WITH IMPEDANCE CHARACTERISTICS

FIELD OF THE INVENTION

The present invention relates to a guide roller assembly for use in a video cassette recorder ("VCR"); and, more particularly, to a guide roller assembly capable of additionally performing the role of an impedance roller, thereby improving the reliability of the VCR and facilitating a manufacturing process thereof.

DESCRIPTION OF THE PRIOR ART

As is well known, a VCR is equipped with a guide roller assembly and an impedance roller assembly. The guide and the impedance roller assemblies serve, respectively, to constrain and to stabilize the movement of a magnetic tape loaded in the VCR.

Referring to FIG. 1, there is shown a schematic view of a deck 10 of the VCR and a video cassette loaded therein. A variety of components are installed on the deck 10, including a pair of pole base assemblies 1, a plurality of guide posts 3, a head drum assembly 5, an impedance roller assembly 8, and a plurality of tension poles 9.

When the video cassette is loaded in the VCR, a pair of guide roller assemblies 2 and a pair of slant poles la installed on the pole base assemblies 1 snag a magnetic tape T contained in the video cassette. Subsequently, the pole base assemblies 1 slide towards the head drum assembly 5, pulling the magnetic tape T out of the video cassette and wrapping it partially around the head drum assembly 5, thereby allowing it to read from, or write to, the magnetic tape T.

However, if the head drum assembly 5 is to properly read from, or write to, the magnetic tape T, a number of conditions must be fulfilled. For example, firstly, the magnetic tape T has to maintain an adequate tension and a proper position in relation to the head drum assembly 5, thereby enabling the magnetic tape T to be wrapped around a predetermined portion of the head drum assembly 5. The tension poles 9 and the guide roller assemblies 2 ensure this by imparting an adequate tension on the magnetic tape T and by constraining the magnetic tape T from moving too far up or too far down in relation to the deck 10, respectively. Secondly, the magnetic tape T has to run smoothly and evenly, and any vibrations in a lengthwise direction of the magnetic tape T that may affect the interaction between the head drum assembly 5 and the magnetic tape T have to be minimized or prevented from occurring. This requirement is fulfilled by the impedance roller assembly 8, whose operation is described in greater detail below.

Referring now to FIG. 2, there is shown a diagram illustrating the conventional guide roller assembly 2, which includes a stationary shaft 2a, a cap 2b, a lower flange 2c, and a guide roller 2d, and is attached to the VCR through a pole base 1.

The guide roller 2d, which is of the shape of a hollow cylinder, is fitted around, and can rotate about, the stationary shaft 2a. When the magnetic tape is loaded in the VCR, and the VCR is in operation, the magnetic tape is wound partly around the guide roller 2d. When the magnetic tape is travelling, the guide roller 2d rotates along with it, minimizing friction that occurs between itself and the magnetic tape.

The lower flange 2c is fitted around the stationary shaft 2a below the guide roller 2d, and the cap 2b is attached to the stationary shaft 2a above the guide roller 2d. Both the cap 2b and the lower flange 2c are slightly larger in diameter than the guide roller 2d. Together, the cap 2b and the lower flange 2c prevent the magnetic tape wound around the guide roller 2d from moving up or down in relation to the guide roller 2d. Thus, the guide roller assembly 2 ensures that the magnetic tape T loaded in the VCR maintains a fixed, predetermined vertical position in relation to the head drum assembly 5 while it travels.

FIG. 3, on the other hand, illustrates the conventional impedance roller assembly 8, which has a stationary shaft 8a, an impedance roller 8b, a pair of bearing assemblies 8c, and a cap 8d, and is installed on a deck 10 of the VCR.

The bearing assemblies 8c are fitted around the stationary shaft 8a. The impedance roller 8b, which is of the shape of a hollow cylinder and is made of a dense material, is, in turn, fitted around the bearing assemblies 8c, wherein the bearing assemblies 8c allow the impedance roller 8b to rotate around the stationary shaft 8a.

The cap 8d, supported by the tip of the stationary shaft 8a, is attached to, and covers the top end of, the impedance roller 8b, to thereby prevent the impedance roller 8b from sinking down in relation to the stationary shaft 8a.

The magnetic tape loaded in the VCR is partially wrapped around the impedance roller 8b. As mentioned above, the impedance roller 8b is made of a dense material and, as a result, possesses a relatively large moment of inertia. This large moment of inertia enables the impedance roller 8b to dampen any lengthwise vibrations of the magnetic tape, thereby making it possible for the magnetic tape to run smoothly and evenly.

However, the VCR equipped with the conventional guide roller and impedance roller assemblies suffers from the disadvantage that the need to provide a separate guide roller assembly and a separate impedance roller assembly complicates the manufacturing process of the VCR. The need for extra steps in the manufacturing process, as well as the increased number of parts, raises the defect rate and leads to a high unit cost. cl SUMMARY OF THE INVENTION It is, therefore, a primary object of the invention to provide to a guide roller assembly capable of additionally performing the role of an impedance roller.

In accordance with one aspect of the present invention, there is provided a guide roller assembly for use in a recorder, installed on a pole base located adjacent to a head drum assembly incorporated in the recorder, the guide roller assembly comprising: a stationary shaft, installed on the pole base with a vertical orientation; means for adjusting the height of the stationary shaft; a guide roller, rotatably fitted around the stationary shaft, and provided with a lower cylindrical section around which a magnetic tape is partially wrapped when a video cassette is loaded in the recorder and an upper, drum-like section that confers additional mass to thereby enable the guide roller to function as an impedance roller, dampening any lengthwise vibrations that occur along the magnetic tape partially wrapped around the guide roller; a lower tape travel guide that prevents the magnetic tape from moving down; and an upper tape travel guide that prevents the magnetic tape from moving up.

BRIEF DESCRIPTION OF THE DRAWINGS

The above and other objects and features of the present invention will become apparent from the following description taken in conjunction with the accompanying drawings, in which.

DETAILED DESCRIPTION OF THE PREFERRED EMBODIMENTS

Figure 1:
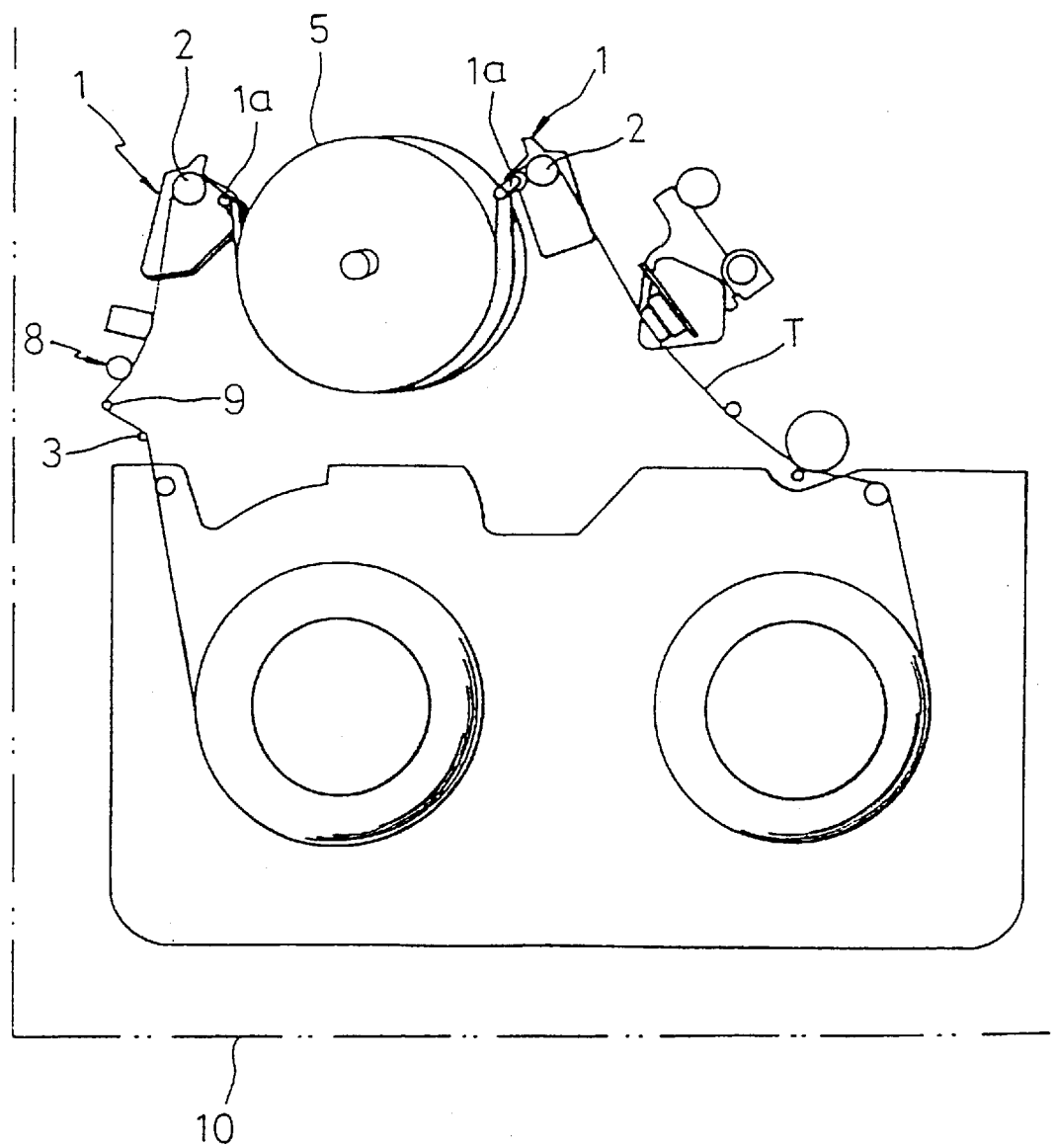
FIG. 1 offers a schematic diagram of a deck of a VCR and a video cassette loaded therein.
Figure 2:
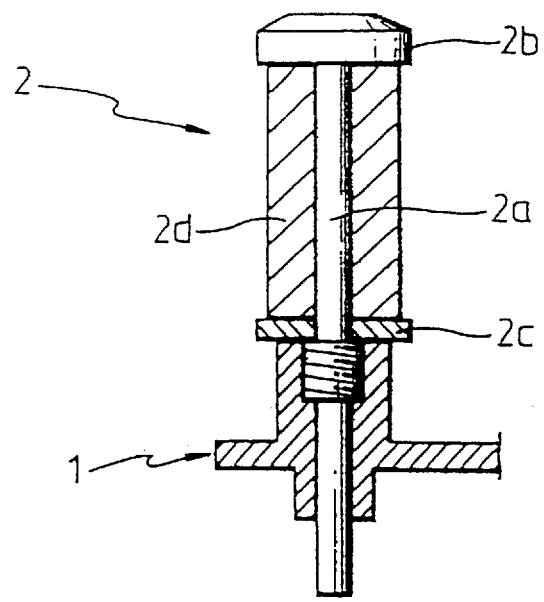
FIG. 2 illustrates a conventional guide roller assembly.
Figure 3:
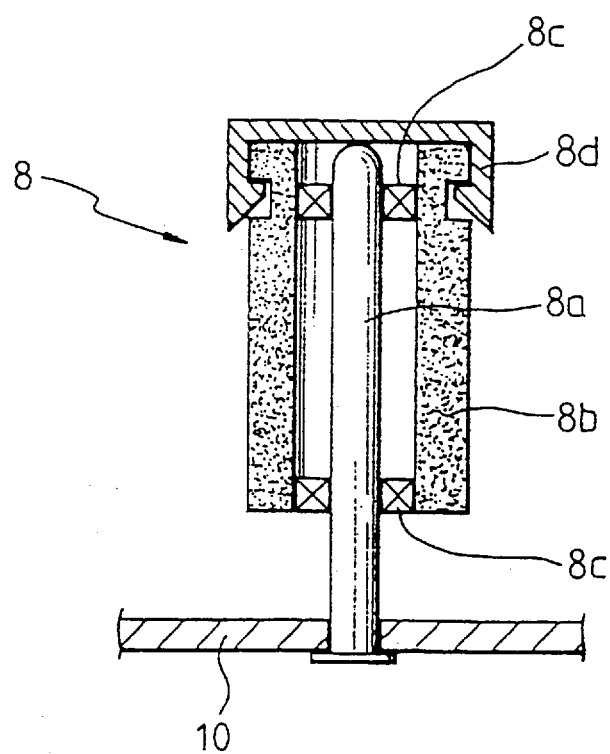
FIG. 3 shows a conventional impedance roller assembly.
Figure 4A:
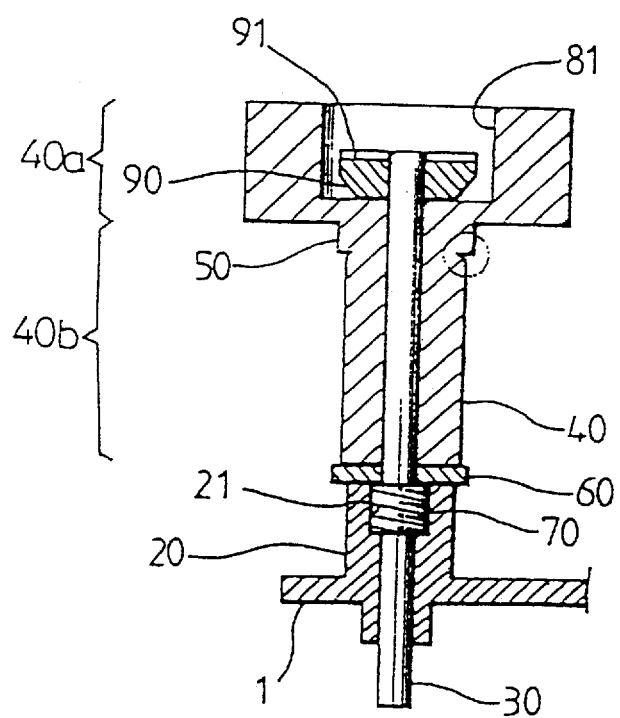
FIGS. 4A and 4B present a guide roller assembly in accordance with a preferred embodiment of the present invention.

Referring to FIG. 4A, there is shown a cross sectional view of a guide roller assembly in accordance with a preferred embodiment of the present invention for use in a video cassette recorder ("VCR"). The guide roller assembly comprises a stationary shaft 30, a guide roller 40, a lower flange 60, a cap 90, and a screw ring 70. The guide roller assembly is installed on a cylindrical boss 20 prepared on the top surface of a pole base assembly 1, which, in turn, is located adjacent to a head drum assembly (not shown) incorporated in the VCR.

Concerning the description of the prior art presented above, and the discussion undertaken below, it should be noted that like parts appearing in the drawings are denoted by like reference numerals.

For ease of explanation, the stationary shaft 30 will be arbitrarily divided into an upper portion, around which the cap 90, the guide roller 40, and the lower flange 60 are fitted, a lower portion, and a screw ring attachment portion between the upper and the lower portions.

The screw ring 70 is tightly fitted around the screw ring attachment portion between the upper and lower portions of the stationary shaft 30 and its circumferential, i.e., outer, surface is provided with threads which allow it to function as a screw.

The disk-shaped lower flange 60, with a hole in its center, is tightly fitted around the upper portion of the stationary shaft 30, above the screw ring 70, and has a larger outer diameter than the screw ring 70 and the guide roller 40.

The long upright cylindrical guide roller 40 rotatably fitted around the upper portion of the stationary shaft 30, above and flush against the lower flange 60, consists of an upper portion widening out to form a drum-like section 40a and an unwidened cylindrical portion 40b below the drum section 40a. The cylindrical section 40b and the drum section 40a of the guide roller 40 are co-axial, and are both provided with a perforation (not shown) along their common axis that accommodates the stationary shaft 30. As mentioned above, the cylindrical section 40b has a diameter slightly smaller than that of the lower flange 60.

The drum section 40a of the guide roller 40 is provided with a round depression 81 on its top surface, whereinto the top portion of the stationary shaft 30 extends. The cap 90 is tightly fitted around the portion of the stationary shaft 30 that extends into the round depression 81, and is provided with shallow, narrow grooves 91, which facilitate the turning of the cap 90 by, e.g., a screwdriver.

Figure 5:
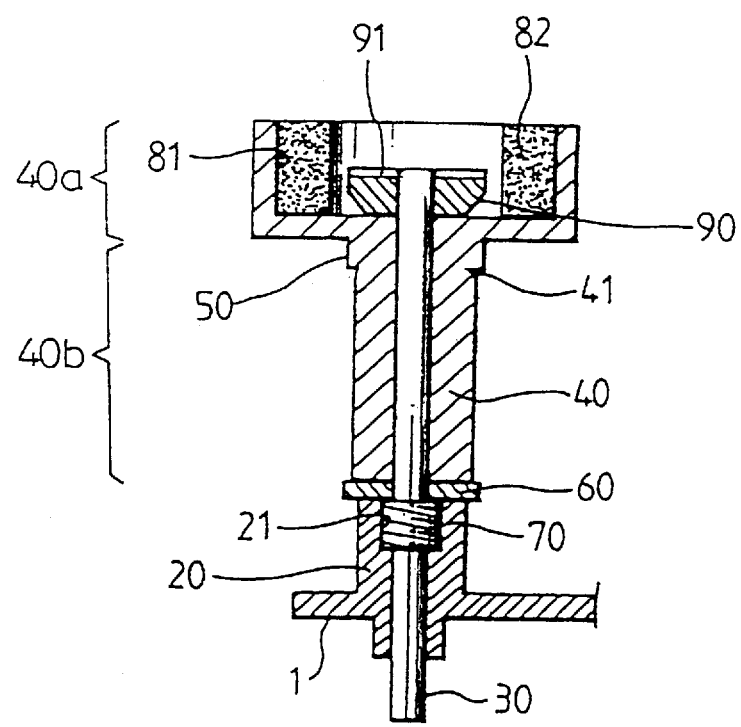
FIG. 5 depicts a guide roller assembly in accordance with a second preferred embodiment of the present invention.

An added mass and an enlarged diameter of the drum section 40a increase the moment of inertia of the inventive guide roller assembly in such a way that it is allowed to perform the function of the conventional impedance roller, dampening any lengthwise vibrations of the magnetic tape. However, if even more added mass is desired, a weight 82 can be added to the guide roller 40 as shown in FIG. 5. FIG. 5 illustrates a guide roller assembly provided with an alternative drum section 40a, wherein the round depression 81 can accommodate the ring-shaped weight 82 of a high-density, high-mass material, e.g., metal. To ensure a proper rotation of the guide roller 40, the weight 82 should be centered around the axis of rotation of the guide roller 40.

Figure 4B:
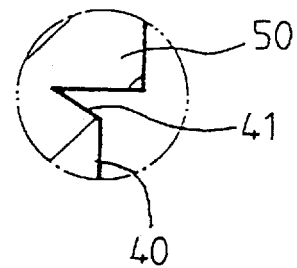

An upper portion of the cylindrical section 40b, where it joins the drum section 40a, has a diameter slightly larger than the rest of the cylindrical section 40b, but smaller than that of the drum section 40a, and constitutes an upper flange 50. Additionally, as seen in FIG. 4B, a notch 41 circumscribes the cylindrical section 40b where the upper flange 50 and the rest of the cylindrical section 40b are joined.

The lower flange 60 and the upper flange 50 permit the inventive guide roller assembly to perform the function of the conventional guide roller assembly by constraining a magnetic tape (not shown) loaded in the VCR and partially wrapped around the cylindrical section 40b, between the lower flange 60 and the upper flange 50, from moving too far up or too far down and straying from its proper path. In addition, since any protruding irregularity present at the area where the upper flange 50 joins the rest of the cylindrical section 40b may cause the magnetic tape to slide up or down, the notch 41 has been prepared to prevent the occurrence of any such irregularities.

As previously mentioned, the guide roller assembly described above is installed on the cylindrical boss 20 prepared on the top surface of the pole base 1, which is located adjacent to the head drum assembly incorporated in the VCR. The lower portion of the stationary shaft 30, i.e., the portion of the shaft 30 that extends below the screw ring 70, fits tightly into a vertical bore hole (not shown) that perforates the cylindrical boss 20 and the pole base 1. In addition, the cylindrical boss 20 is provided on its top surface with a screw hole 21 which accepts the screw ring 70. The screw hole 21 is equipped with threads matching those on the screw ring 70 so that the vertical position of the guide roller 40 can be adjusted by turning the cap 90 which is tightly fitted around the stationary shaft 30 and the screw ring 70 together, wherein the screw ring 70 interacts with the screw hole 21, moving the stationary shaft 30 up or down.

The guide roller assembly in accordance with the preferred embodiment of the present invention is installed on a deck at the same location as the conventional guide roller assembly, i.e., near the head drum assembly incorporated in the VCR, and is capable of performing the functions of both the conventional guide roller assembly and the conventional impedance roller assembly.

The fact that the guide roller assemblies and the impedance roller assemblies do not need to be provided separately reduces the number of steps in the manufacturing process, as well as the number of parts required. In turn, this leads to a lower defect rate and a reduced unit cost.

While the present invention has been shown and described with reference to the particular embodiments, it will be apparent to those skilled in the art that many changes and modifications may be made without departing from the spirit and scope of the invention as defined in the appended claims.

What is claimed is:

1. A guide roller assembly comprising:

a stationary shaft having an upper portion and a middle portion;

a screw ring disposed on the middle portion of the stationary shaft and having a threaded outer surface;

a disk-shaped lower flange positioned on the stationary shaft abutting against the screw ring;

a guide roller rotatably fitted onto the upper portion of the stationary shaft, said guide roller comprising a cylindrical section abutting against the lower flange, an upper flange having a diameter slightly larger than a diameter of the cylindrical section, a drum section having a diameter larger than the diameter of the upper flange and a circular depression on its top surface, an added mass being contained in the circular depression of the drum section, wherein the drum section increases the moment of inertia of the guide roller to dampen lengthwise vibrations of a magnetic tape travelling between the upper and lower flanges; and a cap secured on the upper portion of the stationary shaft and extending into the circular depression in the drum section.

2. The guide roller assembly according to claim 1 further comprising a notch positioned at a joint of the upper flange and the cylindrical section.

3. The guide roller assembly according to claim 1, wherein the added mass is a ring-shaped weight.

4. The assembly of claim 1, wherein the added mass comprises a ring-shaped weight placed along a periphery of the circular depression of the drum section.

* * * * *